United States Patent
Watanabe

(10) Patent No.: US 10,155,863 B2
(45) Date of Patent: Dec. 18, 2018

(54) PHENOLIC RESIN COMPOSITION AND MOLDED BODY

(71) Applicant: SUMITOMO BAKELITE CO., LTD., Tokyo (JP)

(72) Inventor: Yusuke Watanabe, Tokyo (JP)

(73) Assignee: SUMITOMO BAKELITE CO., LTD., Tokyo (JP)

(*) Notice: Subject to any disclaimer, the term of this patent is extended or adjusted under 35 U.S.C. 154(b) by 2 days.

(21) Appl. No.: 15/522,229

(22) PCT Filed: Oct. 5, 2015

(86) PCT No.: PCT/JP2015/078146
§ 371 (c)(1),
(2) Date: Apr. 26, 2017

(87) PCT Pub. No.: WO2016/067833
PCT Pub. Date: May 6, 2016

(65) Prior Publication Data
US 2017/0313871 A1 Nov. 2, 2017

(30) Foreign Application Priority Data
Oct. 31, 2014 (JP) .................... 2014-222872

(51) Int. Cl.

| | | |
|---|---|---|
| C08L 61/14 | (2006.01) | |
| C08K 3/34 | (2006.01) | |
| C08K 3/40 | (2006.01) | |
| C08L 61/06 | (2006.01) | |
| C08K 3/013 | (2018.01) | |

(52) U.S. Cl.
CPC .............. C08L 61/14 (2013.01); C08K 3/013 (2018.01); C08K 3/34 (2013.01); C08K 3/40 (2013.01); C08L 61/06 (2013.01); *C08L 2205/02* (2013.01)

(58) Field of Classification Search
CPC ............ C08K 3/34; C08K 3/40; C08K 3/013
USPC ........................................................ 524/541
See application file for complete search history.

(56) References Cited

U.S. PATENT DOCUMENTS 5,162,428 A * 11/1992 Katoh .................. C08L 61/04
524/593

2013/0059974 A1 * 3/2013 Inokawa ................... C08K 3/04
524/594
2014/0073732 A1 * 3/2014 Inokawa ................... C08K 3/04
524/540

FOREIGN PATENT DOCUMENTS

| EP | 2568002 A1 | 9/2012 |
|---|---|---|
| JP | 59-105048 A | 6/1984 |
| JP | 07309997 A * | 11/1995 |
| JP | 2004277599 A * | 10/2004 |
| JP | 2009035661 A * | 2/2009 |
| JP | 2011-068705 A | 4/2011 |
| JP | 2011-173970 A | 9/2011 |
| JP | 2012067209 A * | 4/2012 |
| JP | 2012-149128 A | 8/2012 |

OTHER PUBLICATIONS

International Search Report dated Dec. 22, 2015, issued in counterpart International Application No. PCT/JP2015/078146 (2 pages).

* cited by examiner

*Primary Examiner* — Michael Bernshteyn
(74) *Attorney, Agent, or Firm* — Westerman, Hattori, Daniels & Adrian, LLP

(57) ABSTRACT

There is provided a phenolic resin composition as a molding material. It includes a resol-type phenolic resin (A) and a novolac-type phenolic resin (B). The novolac-type phenolic resin (B) includes a novolac-type phenolic resin (B1) represented by General Formula (1) and a modified novolac-type phenolic resin (B2) represented by General Formula (2).

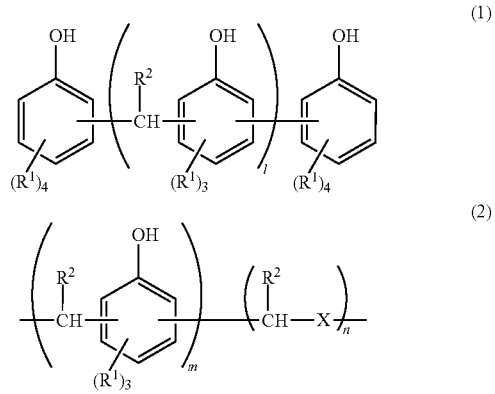

6 Claims, No Drawings

PHENOLIC RESIN COMPOSITION AND MOLDED BODY

TECHNICAL FIELD

The present invention relates to a phenolic resin composition and a molded body.

BACKGROUND ART

Attempts have hitherto been made to use phenolic resin molding materials, instead of metal materials or ceramic materials, with respect to mechanical parts for use in vehicles and the like. Since such phenolic resin molding materials are much lighter than metal materials and the like, developments for applying the phenolic resin molding materials to various members have been more actively performed.

As a technique with regard to such a phenolic resin, for example, the techniques described in Patent Document 1 and Patent Document 2, and the like are known. In these documents, it is described that phenolic resin molding materials having blends at specific ratios have excellent heat resistance and mechanical strength.

RELATED DOCUMENT

Patent Document

[Patent Document 1] Japanese Laid-Open Patent Publication No. S59-105048
[Patent Document 2] Japanese Laid-Open Patent Publication No. 2012-149128

SUMMARY OF THE INVENTION

Technical Problem

However, it could be found that when substitution of metal parts or the like with phenolic resins are performed, there are the problems as shown below.

That is, when a molded body is manufactured using a phenolic resin composition, it is general to add a curing agent such as hexamethylenetetramine to a resin composition from the viewpoint of promoting curing, as described in Patent Documents 1 and 2.

In a case of blending hexamethylenetetramine and the like as above, and subjecting the blend to crosslinking, dense crosslinking can be performed, and thus, an effect of improving water absorption resistance can be expected. However, there is a defect in that a gas remaining within a phenolic resin molded article is difficult to be excluded.

In this case, since the remaining gas is slowly discharged in such an environment used for the molded article, there is a concern that a dimensional change due to the slow discharge occurs.

That is, in the present technical field, if the crosslinking density is set to be excessively high, the dimensional change due to water absorption or moisture absorption can be suppressed, but the dimensional change due to heating tends to increase. Therefore, there is a strong demand for development a technique for suppressing both the dimensional changes.

The present invention has been accomplished in consideration of the problems as described above, and has an object to provide a phenolic resin composition capable of suppressing both the dimensional change due to heating and the dimensional change due to water absorption or moisture absorption of a molded article.

Solution to Problem

According to the present invention, provided is a phenolic resin composition for use as a molding material, including:
a resol-type phenolic resin (A); and
a novolac-type phenolic resin (B),
in which in a case where the total amount of the phenolic resin composition is taken as 100 parts by mass, the total sum of the content of the resol-type phenolic resin (A) and the content of the novolac-type phenolic resin (B) is equal to or more than 10 parts by mass and equal to or less than 40 parts by mass,
in a case where the total amount of the resin components in the phenolic resin composition is taken as 100 parts by mass, the content of the resol-type phenolic resin (A) is equal to or more than 60 parts by mass and equal to or less than 85 parts by mass and the content of the novolac-type phenolic resin (B) is equal to or more than 15 parts by mass and equal to or less than 40 parts by mass,
the novolac-type phenolic resin (B) includes
a novolac-type phenolic resin (B1) represented by General Formula (1), and
a modified novolac-type phenolic resin (B2) represented by General Formula (2), and
in a case where the total amount of the components (B) is taken as 100 parts by mass, the content of the modified novolac-type phenolic resin (B2) represented by General Formula (2) is equal to or more than 10 parts by mass and equal to or less than 70 parts by mass.

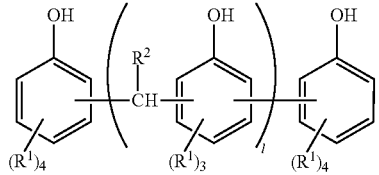

(1)

(In General Formula (1), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, and l is a number of 1 to 10.)

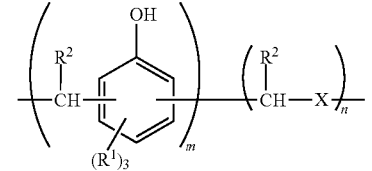

(2)

(In General Formula (2), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, R²'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, the group X is selected from the groups represented by General Formulae (3) to (5) shown below, m is a number of 1 to 10, and n is a number of 1 to 10.)

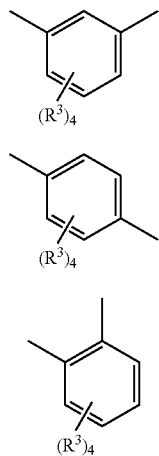

(In General Formulae (3) to (5), R³'s are each independently a hydrogen atom, an alkyl group having 1 to 10 carbon atoms, or a cycloalkyl group having 1 to 10 carbon atoms.)

In addition, according to the present invention, a molded body formed by molding the phenolic resin composition is provided.

Advantageous Effects of Invention

Since the phenolic resin composition of the present invention has a blend of a resol-type phenolic resin (A) and a novolac-type phenolic resin (B) at an appropriate ratio, an appropriate crosslinking density can be achieved in obtaining a molded article. As a result, in addition to imparting mechanical strength for the molded article, suppression of the dimensional change due to heating can be performed.

Furthermore, by using a modified novolac-type phenolic resin for a part of the novolac-type phenolic resin (B), the crosslinking density can be appropriately reduced. Thus, the amount of gas components that are generated by a condensation reaction also decreases, and thus, additional suppression of the dimensional change due to heating can be performed.

In addition, the modified novolac-type phenolic resin has a relatively small number of phenolic hydroxyl groups, and thus, the moisture absorption from the outside can be disturbed. As a result, suppression of the dimensional change due to water absorption or moisture absorption can be effectively performed. Further, although the details are not clear, it is considered that the phenolic resin composition has a crosslinked structure which allows the gas components to be easily discharged, and therefore, at a time of baking, the gas components included within the resin molded body may be efficiently and easily excluded, and thus, problems of discharge of the remaining gas in the environment used for the molded article are solved, which is considered to contribute to suppression of the dimensional change due to heating of the molded article.

Therefore, according to the phenolic resin composition of the present invention, both the dimensional change due to heating and the dimensional change due to water absorption or moisture absorption of the obtained molded article can be suppressed.

DESCRIPTION OF EMBODIMENTS

Hereinbelow, the present invention will be specifically described with reference to embodiments. Further, in the present specification, "to" is used to represent a range from a lower limit to an upper limit unless otherwise specified.

The phenolic resin composition of the present embodiment includes the following characteristics.

That is, the phenolic resin composition of the present embodiment includes a phenolic resin composition for use as a molding material including a resol-type phenolic resin (A) and a novolac-type phenolic resin (B), in which in a case where the total amount of the phenolic resin composition is taken as 100 parts by mass, the total sum of the content of the resol-type phenolic resin (A) and the content of the novolac-type phenolic resin (B) is equal to or more than 10 parts by mass and equal to or less than 40 parts by mass; in a case where the total amount of the resin components in the phenolic resin composition is taken as 100 parts by mass, the content of the resol-type phenolic resin (A) is equal to or more than 60 parts by mass and equal to or less than 85 parts by mass and the content of the novolac-type phenolic resin (B) is equal to or more than 15 parts by mass and equal to or less than 40 parts by mass, and the novolac-type phenolic resin (B) includes a novolac-type phenolic resin (B1) represented by General Formula (1) and a modified novolac-type phenolic resin (B2) represented by General Formula (2); and in a case where the total amount of the components (B) is taken as 100 parts by mass, the content of the modified novolac-type phenolic resin (B2) represented by General Formula (2) is equal to or more than 10 parts by mass and equal to or less than 70 parts by mass.

By blending the respective components at a specific ratio as described above, it is possible to provide a phenolic resin composition capable of suppressing both the dimensional change due to heating and the dimensional change due to water absorption or moisture absorption for the obtained molded article.

Hereinafter, the respective components blended as the phenolic resin composition according to the present embodiment, and the blending amounts thereof will be described.

[Resol-Type Phenolic Resin (A)]

The phenolic resin composition of the present embodiment includes a resol-type phenolic resin (A) as a main component.

By using the resol-type phenolic resin (A), the crosslinking density for a molded article can be appropriately improved, the toughness of the molded article can be improved, and the mechanical strength can be enhanced. Further, since the crosslinking density can be appropriately improved as described above, the dimensional change due to water absorption or moisture absorption of the molded article can be efficiently suppressed.

The resol-type phenolic resin (A) according to the present embodiment can be obtained by reacting phenols and aldehydes, usually at a molar ratio of aldehydes to phenols (aldehydes/phenols) of 1.3 to 1.7, in the presence of a basic catalyst.

Moreover, the phenols that are used in the preparation of the resol-type phenolic resin (A) according to the present embodiment are not particularly limited, and examples thereof include phenol, o-cresol, m-cresol, p-cresol, xylenol, alkylphenols, catechol, and resorcin. Incidentally, these phenols may be used singly or as a mixture of two or more kinds thereof.

Furthermore, the aldehydes that are used in the preparation of the resol-type phenolic resin (A) according to the present embodiment are not particularly limited, and for example, aldehyde compounds such as formaldehyde, paraformaldehyde, and benzaldehyde, and materials that are sources for generating these aldehyde compounds, or solutions of these aldehyde compounds can be used. Further, these aldehydes may be used singly or as a mixture of two or more kinds thereof.

The lower limit value of the number-average molecular weight of the resol-type phenolic resin (A) according to the present embodiment can be appropriately set depending on applications, but is, for example, equal to or more than 400, preferably equal to or more than 450, and more preferably equal to or more than 500.

Furthermore, the upper limit value of the number-average molecular weight of the resol-type phenolic resin (A) can be appropriately set depending on applications, but is, for example, equal to or less than 2,000, preferably equal to or less than 1,800, and more preferably equal to or less than 1,500.

This number-average molecular weight can be calculated, based on a calibration curve prepared using a polystyrene standard material, by means of gel permeation chromatography (GPC).

In a case where the total amount of the resin components in the phenolic resin composition is taken as 100 parts by mass, the lower limit value of the content of the resol-type phenolic resin (A) is equal to or more than 60 parts by mass, preferably equal to or more than 63 parts by mass, and more preferably equal to or more than 65 parts by mass. By setting the lower limit value as described above, the crosslinking density can be appropriately improved, and as a result, the heat resistance can be improved and the dimensional change due to water absorption or moisture absorption can be suppressed.

In a case where the total amount of the resin components in the phenolic resin composition is taken as 100 parts by mass, the upper limit value of the content of the resol-type phenolic resin (A) is equal to or less than 85 parts by mass, preferably equal to or less than 80 parts by mass, and more preferably equal to or less than 75 parts by mass. By setting the upper limit value as described above, the crosslinking density is controlled to a value that is not excessively high, which can contribute to suppression of the dimensional change due to heating for the molded article.

[Novolac-Type Phenolic Resin (B)]

The novolac-type phenolic resin (B) according to the present embodiment includes a novolac-type phenolic resin (B1) represented by General Formula (1) and a modified novolac-type phenolic resin (B2) represented by General Formula (2), each shown below.

In a case where the total amount of the resin components in the phenolic resin composition is taken as 100 parts by mass, the lower limit value of the content of the novolac-type phenolic resin (B) is equal to or more than 15 parts by mass, preferably equal to or more than 20 parts by mass, and more preferably equal to or more than 25 parts by mass. By setting the lower limit value as described above, an appropriate crosslinking density can be achieved.

In a case where the total amount of the resin components in the phenolic resin composition is taken as 100 parts by mass, the upper limit value of the content of the novolac-type phenolic resin (B) is equal to or less than 40 parts by mass, preferably equal to or less than 37 parts by mass, and more preferably equal to or less than 35 parts by mass. By setting the upper limit value as described above, appropriate mechanical strength can be imparted.

Hereinafter, the component (B1) and the component (B2) included as the component (B) will be described.

(Novolac-Type Phenolic Resin (B1) Represented by General Formula (1))

The component (B1) used in the present embodiment is a novolac-type phenolic resin represented by General Formula (1) below.

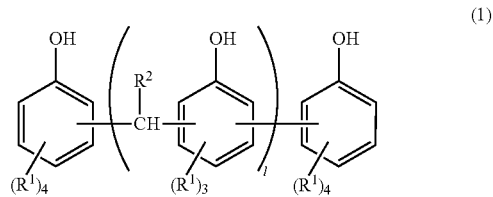

(In General Formula (1), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, and l is a number of 1 to 10.)

This component (B1) can be appropriately selected depending on applications as long as it is a resin obtained by reacting phenols and aldehydes without a catalyst or in the presence of an acidic catalyst. For example, a random novolac-type or high-ortho novolac-type phenolic resin can be used.

In addition, this novolac-type phenolic resin can be usually obtained by reacting aldehydes and phenols after the molar ratio of the aldehydes to the phenols (aldehydes/phenols) is controlled to 0.7 to 0.9.

Specific examples of the phenols that are used in the production of the component (B1) include phenol, o-cresol, m-cresol, p-cresol, xylenol, alkylphenols, catechol, and resorcin. Further, these phenols may be used singly or as a mixture of two or more kinds thereof.

Furthermore, as the aldehydes that are used in the production of the component (B1), for example, aldehyde compounds such as formaldehyde, paraformaldehyde, and benzaldehyde, and materials that are sources for generating these aldehyde compounds, or solutions of these aldehyde compounds can be used. Further, these aldehydes may be used singly or as a mixture of two or more kinds thereof.

With regard to the molecular weight of the component (B1), for example, the component (B1) having a number-average molecular weight of 400 to 1,200 can be used, and preferably, the component (B1) having a number-average molecular weight in a range of 500 to 1,000 can be used.

By setting the number-average molecular weight of the component (B1) to this range, the workability in the preparation of a phenolic resin composition is improved, and thus, the moldability in obtaining a molded article from the composition can be improved. In addition, improvement of the mechanical strength of the obtained molded article can also be achieved.

Furthermore, the number-average molecular weight can be calculated, based on a calibration curve prepared using a polystyrene standard material, by means of gel permeation chromatography (GPC), in the same manner as for the component (A).

In a case where the total amount of the components (B) is taken as 100 parts by mass, the lower limit value of the content of the component (B1) is, for example, equal to or more than 30 parts by mass, preferably equal to or more than 40 parts by mass, and more preferably equal to or more than 50 parts by mass. By setting the lower limit value as described above, appropriate processability can be imparted.

Furthermore, in a case where the total amount of the components (B) is taken as 100 parts by mass, the upper limit value of the content of the component (B1) is, for example, equal to or less than 90 parts by mass, preferably equal to or less than 80 parts by mass, and more preferably equal to or less than 75 parts by mass. By setting the upper limit value as described above, appropriate mechanical strength can be imparted.

Moreover, in a case where the total amount of the resin components in the phenolic resin composition is taken as 100 parts by mass, the lower limit value of the content of the component (B1) is, for example, equal to or more than 10 parts by mass, preferably equal to or more than 12 parts by mass, and more preferably equal to or more than 15 parts by mass. By setting the lower limit value as described above, appropriate processability can be imparted.

In addition, in a case where the total amount of the resin components in the phenolic resin composition is taken as 100 parts by mass, the upper limit value of the content of the component (B1) is, for example, equal to or less than 35 parts by mass, preferably equal to or less than 30 parts by mass, and more preferably equal to or less than 25 parts by mass. By setting the upper limit value as described above, appropriate mechanical strength can be imparted.

Moreover, as the novolac-type phenolic resin (B1) represented by General Formula (1) of the present embodiment, the resin in which $R^1$ and $R^2$ in General Formula (1) are all hydrogen atoms, that is, the resin obtained by reacting a phenol and a formaldehyde is preferably used due to high easiness in availability.

(Modified Novolac-Type Phenolic Resin (B2) Represented by General Formula (2))

The component (B2) used in the present embodiment is a modified novolac-type phenolic resin represented by General Formula (2) below.

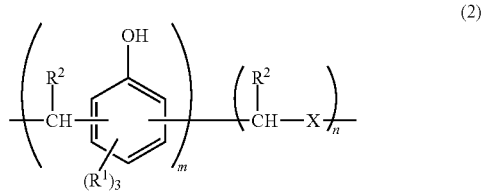

(In General Formula (2), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, the group X is selected from the groups represented by General Formulae (3) to (5) shown below, m is a number of 1 to 10, and n is a number of 1 to 10.)

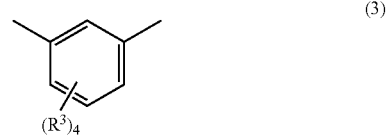

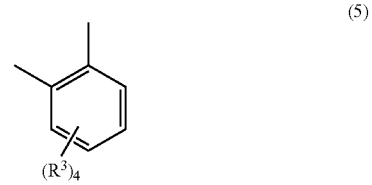

(In General Formulae (3) to (5), $R^3$'s are each independently a hydrogen atom, an alkyl group having 1 to 10 carbon atoms, or a cycloalkyl group having 1 to 10 carbon atoms.)

The component (B2) can be produced, for example, in the following manner.

That is, in a case of a benzene-modified phenolic resin corresponding to the case where $R^3$'s in General Formulae (3) to (5) are all hydrogen atoms, the component (B2) can be produced by, for example, reacting paraxylenedimethyl ether and phenols in the presence of an acidic catalyst. Further, in a case of a substituted benzene-modified phenolic resin corresponding to the case where $R^3$'s in General Formulae (3) to (5) are all alkyl groups having 1 to 10 carbon atoms or cycloalkyl groups having 1 to 10 carbon atoms, the component (B2) can be produced by first reacting substituted benzenes and aldehydes in the presence of an acidic catalyst, and reacting the obtained polymerization product with phenols, or phenols and aldehydes in the presence of an acidic catalyst.

By performing these, it is possible to interpose a structural unit derived from benzenes or substituted benzenes in the repeating unit of the novolac-type phenolic resin.

In addition, although the structural unit at the terminal in General Formula (2) is not shown, both a structural moiety derived from phenols and a structural moiety derived from benzenes or substituted benzenes can be taken as the structural unit.

Moreover, the modification rate of (B2) according to the present embodiment is defined as a ratio (a value of n/m+n) of n to a sum of m and n in General Formula (2).

This modification rate can be appropriately controlled depending on applications for use, and the like, but the lower limit value is, for example, equal to or more than 0.15, and preferably equal to or more than 0.20.

In addition, the upper limit value is, for example, equal to or less than 0.60, and preferably equal to or less than 0.50.

By setting the values to such ranges, the crosslinking density can be controlled to an appropriate value in manufacturing a molded article from the phenolic resin composition.

Specific examples of the phenols that are used in the production of the component (B2) include phenol, o-cresol, m-cresol, p-cresol, xylenol, alkylphenols, catechol, and resorcin. Further, these phenols may be used singly or as a mixture of two or more kinds thereof.

Furthermore, as the aldehydes that are used in the production of the component (B2), for example, aldehyde compounds such as formaldehyde, paraformaldehyde, and benzaldehyde, and materials that are sources for generating these aldehyde compounds, or solutions of these aldehyde compounds can be used. Further, these aldehydes may be used singly or as a mixture of two or more kinds thereof.

As the substituted benzenes used in the production of the component (B2), toluene, xylene, mesitylene, cyclohexylbenzene, or the like can be used.

In fact, in the production of the component (B2), it is preferable in view of high easiness in availability that the benzenes, or toluene or xylene among the substituted benzenes is employed, and phenols having $R^1$ groups being all hydrogen atoms as the phenols are employed to produce a benzene-modified novolac-type phenolic resin, a toluene-modified novolac-type phenolic resin, or a xylene-modified novolac-type phenolic resin, which is employed as the component (B2).

With regard to the molecular weight of the component (B2), for example, the component (B2) having a number-average molecular weight of 500 to 3,000 can be used, and the component (B2) having a number-average molecular weight in a range of 700 to 2,500 can be preferably used.

By setting the number-average molecular weight of the component (B2) to this range, the workability in the preparation of a phenolic resin composition is improved, and thus, the moldability in obtaining a molded article from the composition can be improved. In addition, improvement of the mechanical strength of the obtained molded article can also be achieved.

The number-average molecular weight can be calculated, based on a calibration curve prepared using a polystyrene standard material, by means of gel permeation chromatography (GPC).

In a case where the total amount of the components (B) is taken as 100 parts by mass, the lower limit value of the content of the component (B2) is equal to or more than 10 parts by mass, preferably equal to or more than 20 parts by mass, and more preferably equal to or more than 25 parts by mass. By setting the lower limit value as described above, appropriate processability can be imparted.

Furthermore, in a case where the total amount of the components (B) is taken as 100 parts by mass, the upper limit value of the content of the component (B2) is equal to or less than 70 parts by mass, preferably equal to or less than 60 parts by mass, and more preferably equal to or less than 50 parts by mass. By setting the upper limit value as described above, appropriate mechanical strength can be imparted.

Moreover, in a case where the total amount of the resin components in the phenolic resin composition is taken as 100 parts by mass, the lower limit value of the content of the component (B2) is, for example, equal to or more than 3 parts by mass, preferably equal to or more than 5 parts by mass, and more preferably equal to or more than 8 parts by mass. By setting the lower limit value as described above, appropriate processability can be imparted.

In addition, in a case where the total amount of the resin components in the phenolic resin composition is taken as 100 parts by mass, the upper limit value of the content of the component (B2) is, for example, equal to or less than 20 parts by mass, preferably equal to or less than 18 parts by mass, and more preferably equal to or less than 15 parts by mass. By setting the upper limit value as described above, appropriate mechanical strength can be imparted.

With regard to the component (A) and the component (B) as described above, in a case where the total amount of the phenolic resin composition is taken as 100 parts by mass, the lower limit value in the total sums of the content of the resol-type phenolic resin (A) and the content of the novolac-type phenolic resin (B) in the phenolic resin composition of the present embodiment is equal to or more than 10 parts by mass, and more preferably set to equal to or more than 15 parts by mass.

Furthermore, in a case where the total amount of the phenolic resin composition is taken as 100 parts by mass, the upper limit value in the total sums of the content of the resol-type phenolic resin (A) and the content of the novolac-type phenolic resin (B) in the phenolic resin composition of the present embodiment is equal to or less than 40 parts by mass, and more preferably set to equal to or less than 35 parts by mass.

By setting the values to such ranges, appropriate mechanical strength for a molded article can be achieved while providing flowability during the molding.

[Curing Agent]

A curing agent can be added to the phenolic resin composition of the present embodiment, if desired. Examples of the curing agent include hexamethylenetetramine, an adduct of hexamethylenetetramine with a phenol derivative, amine-based aldehyde sources such as hexamethoxymethylolmelamine, and aldehyde sources such as paraformaldehyde and a polyacetal resin.

In addition, when the phenolic resin composition is crosslinked, this curing agent is incorporated into the crosslinked structure. From this viewpoint, in the present specification, this curing agent is encompassed by the "resin components".

Here, the content of the curing agent can be appropriately set, but in the phenolic resin composition of the present embodiment, it is preferable that the curing agent does not substantially include hexamethylenetetramine, and it is more preferable that the curing agent does not substantially include other amine-based aldehyde sources, in addition to the hexamethylenetetramine.

In the present technical field, it is general that amine-based aldehyde sources such as hexamethylenetetramine are blended into the phenolic resin composition from the viewpoint of improving the crosslinkability, but in a case where amine-based aldehyde sources such as hexamethylenetetramine are included, the crosslinking density extremely increases in the preparation of a molded article in some cases. In order to solve the problems listed in the present application, it is necessary to control the crosslinking density to be an appropriate value in obtaining a molded article, and therefore, it is preferable that the hexamethylenetetramine and the other amine-based aldehyde sources are not substantially included in the phenolic resin composition.

In addition, in the present specification, "not substantially including" is used to intend to exclude an aspect where the amine-based aldehyde sources such as hexamethylenetetramine is intentionally added, and in the preparation process, an aspect where it is inevitable to avoid the incorporation of the amine-based aldehyde sources such as hexamethylenetetramine is allowed.

Specifically, the content of the amine-based aldehyde sources such as hexamethylenetetramine is controlled to less than 100 ppm, preferably less than 50 ppm, and more preferably less than 10 ppm, with respect to the entire phenolic resin composition.

Moreover, it is more preferable that the phenolic resin composition of the present embodiment does not substantially include not only the amine-based aldehyde sources such as hexamethylenetetramine as described above, but also the curing agent as listed above.

For the phenolic resin composition of the present embodiment, the respective components are used as a resin component, appropriately in combination thereof, and a combination of known resin materials may also be used for the purpose of modifying other characteristics and the like.

Examples of such the resin component include resins having a triazine ring, such as a urea resin and a melamine resin, bismaleimide (BMI) resins, polyurethane resins, silicone resins, resins having a benzoxazine ring, cyanate ester resins, polyvinyl butyral resins, and polyvinyl acetate resins. Further, a combination of a plurality of the resins can also be used, if desired.

[Filler]

In addition to the above-described resin components, a filler can also be blended into the phenolic resin composition of the present embodiment.

This filler can be appropriately selected from known materials, and for example, fiber-shaped fillers, particle-shaped fillers, or the like can be used.

As the fiber-shaped fillers, glass fibers, carbon fibers, fiber-shaped wollastonite, rock wool, or the like can be used. The number-average fiber diameter of the fiber-shaped fillers is, for example, 10 to 15 µm, and those, for example, having a number-average fiber length of 20 µm to 5,000 µm are blended.

By using such fiber-shaped fillers, the workability in the preparation of a phenolic resin composition is improved, and thus, the mechanical strength of the obtained molded article can further be improved.

Furthermore, as the particle-shaped fillers, for example, particle-shaped inorganic filling materials can be used, and glass beads, glass powder, calcium carbonate, talc, silica, aluminum hydroxide, clay, mica, or the like can be used.

In the phenolic resin composition of the present embodiment, the content of such fillers can be appropriately set depending on applications. For example, the fillers can be blended in the content in a range equal to or more than 0.5-fold amount and equal to or less than 5.0-fold amount, more preferably equal to or more than 1-fold amount and equal to or less than 4.5-fold amount, and still more preferably equal to or more than 1.5-fold amount and equal to or less than 4.0-fold amount, with respect to the entire resin component in terms of parts by mass.

[Other Additives]

Moreover, various additives that are used in common thermosetting resin molding materials, for example, release agents such as stearic acid, calcium stearate, and polyethylene, auxiliary curing agents such as magnesium oxide, and calcium hydroxide, colorants such as carbon black, adhesiveness improvers for improving the adhesiveness between a filling material and a thermosetting resin, coupling agents, solvents, or the like may also be blended into the phenolic resin composition according to the present embodiment, if desired.

[Method for Preparing Phenolic Resin Composition]

The phenolic resin composition according to the present embodiment can be prepared by, for example, blending the above-mentioned respective components, uniformly mixing them, then melt-kneading the mixture under heating using a kneading device such as a roll, a kneader, and a biaxial extruder alone or a combination of the roll with another mixing device, and then granulating or grinding the mixture.

[Molded Article]

The molded article according to the present embodiment can be obtained by performing molding steps, using the above-mentioned phenolic resin composition as a molding material. As for a specific example of the molding method, appropriate conditions can be selected from known molding methods such as injection molding, transfer molding, compression molding, injection compression molding, and the like.

The conditions as described herein depend on the thickness of a molded article, and for example, in a case where a molded article having a thickness of about 5 mm is molded by injection molding, conditions of a mold temperature of 170° C. to 190° C., a molding pressure of 100 to 150 MPa, and a curing time of 30 to 90 seconds can be employed.

In addition, the obtained molded article can be subjected to after-baking, if desired, and the conditions for after-baking can be appropriately selected depending on applications. For example, the maximum reaching temperature can be set to 150° C. to 270° C., and the holding time can be set to 1 hour to 15 hours. More preferably, the maximum reaching temperature can be set to 170° C. to 240° C., and the holding time can be set to 1 hour to 10 hours. As the after-baking is carried out at a high temperature, the dimensional change due to heating tends to decrease in the environment used.

[Applications]

In a case where a molded article is obtained from the phenolic resin composition of the present embodiment, both the dimensional change due to heating and the dimensional change due to water absorption or moisture absorption can be suppressed. As a result, it is expected that the molded article can be applied to various applications, for example, members within vehicles and precision instruments, or the like as a member that can exhibit desired characteristics stably even over a long period of time.

It is certain that the applications listed herein are an example of embodiment used in the present invention, and it is needless to say that the composition and the like for the phenolic resin composition of the present invention can be optimized even in other applications.

The embodiments of the present invention have been described above, but these are exemplary embodiments of the present invention. Further, various other configurations in addition to the above embodiments can be employed.

EXAMPLES

Hereinbelow, the present invention will be described in more detail with reference to Examples, but the scope of the present invention is not limited to these Examples.

First, the raw material components used in Examples and Comparative Examples are shown below.

(1) Resol-type phenolic resin: "PR-53529" (the number-average molecular weight: 700) manufactured by Sumitomo Bakelite Co., Ltd.

(2) Novolac-type phenolic resin: "PR-51305" (the number-average molecular weight: 900) manufactured by Sumitomo Bakelite Co., Ltd.

(3) Xylene-modified novolac-type phenolic resin: "PR-51992" (a modification rate with xylene units: 0.30, a number-average molecular weight: 1,100) manufactured by Sumitomo Bakelite Co., Ltd.

(4) Benzene-modified novolac-type phenolic resin: "PR-54869" (a modification rate with benzene units: 0.45, a number-average molecular weight: 1,200) manufactured by Sumitomo Bakelite Co., Ltd.

(5) Hexamethylenetetramine: "HEXAMINE" manufactured by Chang Chun Petrochemical Co. Ltd.

(6) Glass fiber: "CS3E479" (a number-average fiber diameter: 11 μm, a number-average fiber length: 3 mm) manufactured by Nitto Boseki Co., Ltd.

(7) Wollastonite (fiber-shaped): "NYAD325" (a number-average fiber diameter: 10 m, a number-average fiber length: 50 m) manufactured by NYCO Minerals, Inc.

(8) Magnesium oxide: "KYOWAMAG 30" manufactured by Kyowa Chemical Industry Co., Ltd.

(9) Calcium hydroxide: "Super Fine Slaked Lime" manufactured by Kawai Lime Industry Co., Ltd.

(10) Calcium stearate: "Ca-St" manufactured by Nitto Kasei Kogyo K. K.

(11) Carbon black: "#5" manufactured by Mitsubishi Chemical Corporation

With regard to Examples 1 to 3 and Comparative Examples 1 to 4, a granular molding material (phenolic resin composition) was obtained by kneading a material mixture obtained by blending the respective components in accordance with the blending amounts shown in Table 1 below with heating rolls having different rotation numbers, cooling it into a sheet-shaped product, and grinding the product.

Incidentally, the kneading conditions of the heating rolls were as follows: the rotation number was 20/14 rpm on a high-speed side/a low-speed side, the temperature was 90° C./20° C. on a high-speed side/a low-speed side, and the kneading time was 5 to 10 minutes.

With regard to the respective phenolic resin compositions obtained at the blending ratio shown in Table 1, the measurements and the evaluations shown below were carried out.

(Evaluation Items)

(1) Dimensional Change Due to Heating

A cylindrical test piece having an outer diameter of 40 mm, an inner diameter of 34 mm, and a thickness of 3 mm was manufactured by subjecting a granular molding material to injection molding (a mold temperature of 175° C. and a curing time of 50 seconds). The test piece was subjected to an after-baking treatment at 180° C. for 8 hours, and then left to stand for 300 hours in an oven set to a temperature condition of 150° C.

The dimensional change due to heating was evaluated by dimension measurement of the cylindrical inner diameters before and after putting the test piece into the oven. Further, the unit is shown in Table 1 in terms of a ratio of reduction from the inner diameter of 34 mm.

(2) Dimensional Change Due to Humidification

A cylindrical test piece having an outer diameter of 40 mm, an inner diameter of 34 mm, and a thickness of 3 mm was manufactured by subjecting a granular molding material to injection molding (a mold temperature of 175° C. and a curing time of 50 seconds). The test piece was subjected to an after-baking treatment at 180° C. for 8 hours, and then left to stand for 300 hours in a constant temperature and humidity chamber set under a condition of a humidity of 85% and a temperature of 85° C.

The dimensional change due to humidification was evaluated by dimension measurement of the cylindrical inner diameters before and after putting the test piece into the constant temperature and humidity chamber. Further, the unit is shown in Table 1 in terms of a ratio of the increase from the inner diameter of 34 mm.

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| Blends (parts by mass) | Resin component | Resol-type phenolic resin | 70 | 70 | 70 | 85 | 70 | 40 | 78 |
| | | Novolac-type phenolic resin | 20 | 20 | 10 | | 30 | 35 | 14 |
| | | Xylene-modified novolac-type phenolic resin | 10 | | 20 | | | 10 | |
| | | Benzene-modified novolac-type phenolic resin | | 10 | | | | | |
| | | Hexamethylenetetramine | | | | 15 | | 15 | 8 |
| | | Glass fiber | 70 | 70 | 70 | 70 | 70 | 70 | 70 |
| | | Wollastonite | 380 | 380 | 380 | 380 | 380 | 380 | 380 |
| | | Magnesium oxide | | | | 3 | | 3 | 3 |
| | | Calcium hydroxide | 3 | 3 | 3 | | 3 | | |
| | | Calcium stearate | 5 | 5 | 5 | 5 | 5 | 5 | 5 |
| | | Carbon black | 2 | 2 | 2 | 2 | 2 | 2 | 2 |
| Evaluation | | Dimensional change due to heating (150° C. × 300 hours) (%) | −0.017 | −0.022 | −0.015 | −0.072 | −0.032 | −0.069 | −0.045 |
| | | Dimensional change due to humidification (85° C. × 85% RH × 300 hours) (%) | 0.086 | 0.092 | 0.080 | 0.114 | 0.155 | 0.045 | 0.132 |

As shown in Table 1, the phenolic resin compositions obtained in Examples had small dimensional changes in both the dimensional change due to heating and the dimensional change due to humidification.

These results demonstrate that in a case of manufacturing a molded article from the phenolic resin composition of the present invention, the dimensions are stable even in various environments, and thus, desired characteristics can be stably exhibited even over a long period of time.

By the phenolic resin composition of the present invention, it is possible to suppress both the dimensional change due to heating and the dimensional change due to water absorption or moisture absorption when obtaining the molded article. It is expected that such a molded article can be applied to various applications, for example, members within vehicles and precision instruments, or the like as a member that can exhibit desired characteristics stably even over a long period of time.

This application claims priority on the basis of Japanese Patent Application No. 2014-222872 filed on Oct. 31, 2014, the entire disclosure of which is incorporated herein.

The invention claimed is:

1. A phenolic resin composition for use as a molding material, comprising:
a resol-type phenolic resin (A); and
a novolac-type phenolic resin (B),
wherein in a case where the total amount of the phenolic resin composition is taken as 100 parts by mass, the total sum of the content of the resol-type phenolic resin (A) and the content of the novolac-type phenolic resin (B) is equal to or more than 10 parts by mass and equal to or less than 40 parts by mass,
in a case where the total amount of the resin components in the phenolic resin composition is taken as 100 parts by mass, the content of the resol-type phenolic resin (A) is equal to or more than 60 parts by mass and equal to or less than 85 parts by mass and the content of the novolac-type phenolic resin (B) is equal to or more than 15 parts by mass and equal to or less than 40 parts by mass,
the novolac-type phenolic resin (B) includes
a novolac-type phenolic resin (B1) represented by General Formula (1), and
a modified novolac-type phenolic resin (B2) represented by General Formula (2), and
in a case where the total amount of the components (B) is taken as 100 parts by mass, the content of the modified novolac-type phenolic resin (B2) represented by General Formula (2) is equal to or more than 10 parts by mass and equal to or less than 70 parts by mass:

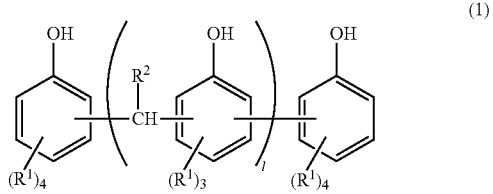

(1)

(in General Formula (1), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, and 1 is a number of 1 to 10),

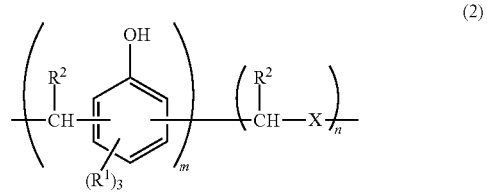

(2)

(in General Formula (2), $R^1$'s each independently represent a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$'s each independently represent a hydrogen atom, an alkyl group having 1 to 10 carbon atoms, a cycloalkyl group having 1 to 10 carbon atoms, or an aryl group or substituted aryl group having 6 to 10 carbon atoms, the group X is selected from the groups represented by General Formulae (3) to (5) shown below, m is a number of 1 to 10, and n is a number of 1 to 10), and

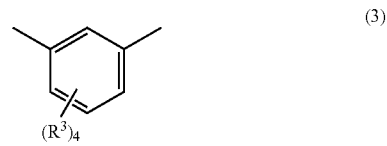

(3)

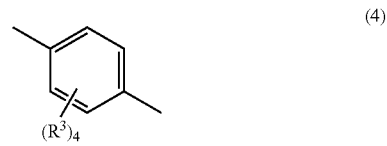

(4)

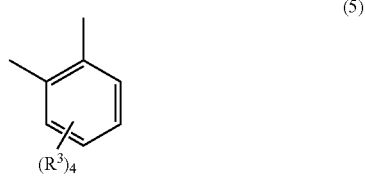

(5)

(in General Formulae (3) to (5), $R^3$'s are each independently a hydrogen atom, an alkyl group having 1 to 10 carbon atoms, or a cycloalkyl group having 1 to 10 carbon atoms).

2. The phenolic resin composition according to claim 1, wherein the modified novolac-type phenolic resin (B2) represented by General Formula (2) is selected from the group consisting of a benzene-modified novolac-type phenolic resin, a toluene-modified novolac-type phenolic resin, and a xylene-modified novolac-type phenolic resin.

3. The phenolic resin composition according to claim 1, wherein the phenolic resin composition does not include hexamethylenetetramine.

4. The phenolic resin composition according to claim 1, wherein the content of amine-based aldehyde sources in the phenolic resin composition is controlled to be less than 100 ppm.

5. The phenolic resin composition according to claim 1, wherein a filler is blended into the phenolic resin composition.

6. A molded body formed by molding the phenolic resin composition according to claim 1.

* * * * *